(12) United States Patent
Blint et al.

(10) Patent No.: US 8,545,779 B2
(45) Date of Patent: Oct. 1, 2013

(54) SULFUR-TOLERANT PEROVSKITE $NO_x$ OXIDATION CATALYSTS

(75) Inventors: Richard J. Blint, Shelby Township, MI (US); Chang H. Kim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 365 days.

(21) Appl. No.: 13/005,573

(22) Filed: Jan. 13, 2011

(65) Prior Publication Data

US 2012/0180453 A1    Jul. 19, 2012

(51) Int. Cl.
*B01D 53/56* (2006.01)
*B01D 53/94* (2006.01)
*C01B 21/36* (2006.01)

(52) U.S. Cl.
USPC ............ 423/213.2; 423/239.1; 423/400; 423/402

(58) Field of Classification Search
USPC ............ 423/239.1, 400, 402, 213.2; 60/299; 502/525
See application file for complete search history.

(56) References Cited

U.S. PATENT DOCUMENTS

| 4,160,013 A * | 7/1979 | Whelan ...................... 423/402 |
| 2010/0086458 A1 | 4/2010 | Kim et al. |
| 2010/0229533 A1 | 9/2010 | Li et al. |
| 2010/0233045 A1 | 9/2010 | Kim et al. |
| 2013/0045437 A1 * | 2/2013 | Chen et al. ................... 429/527 |

OTHER PUBLICATIONS

Chonghe Li et al; Formability of Perovskites;Journal of Alloys and Compounds, vol. 372, pp. 40-48, 2004.
R.D. Shannon; Revised Effective Ionic Radii and Systematic Studies of Interatomic Distances in Halides and Chalcogenides; Acta Crystallographica, (1976), A32, pp. 751-767. Data at website http://abulafia.mt.ic.ac.uk/shannon/ maintained by the Materials Department of Imperial College (London, UK).
C.H. Kim et al; Strontium-Doped Perovskites Rival Platinum Catalysts for Treating NOx in Simulated Diesel Exhaust; Science, (2010), 327, pp. 1624-1627.

* cited by examiner

*Primary Examiner* — Timothy Vanoy
(74) *Attorney, Agent, or Firm* — Reising Ethington P.C.

(57) ABSTRACT

A method for catalytic oxidation of NO to $NO_2$ in the sulfur-containing exhaust gases of lean-burn engines, such as diesel engines is disclosed. The catalysts are oxide perovskites with a credible likelihood of being sulfur-tolerant.

8 Claims, 3 Drawing Sheets

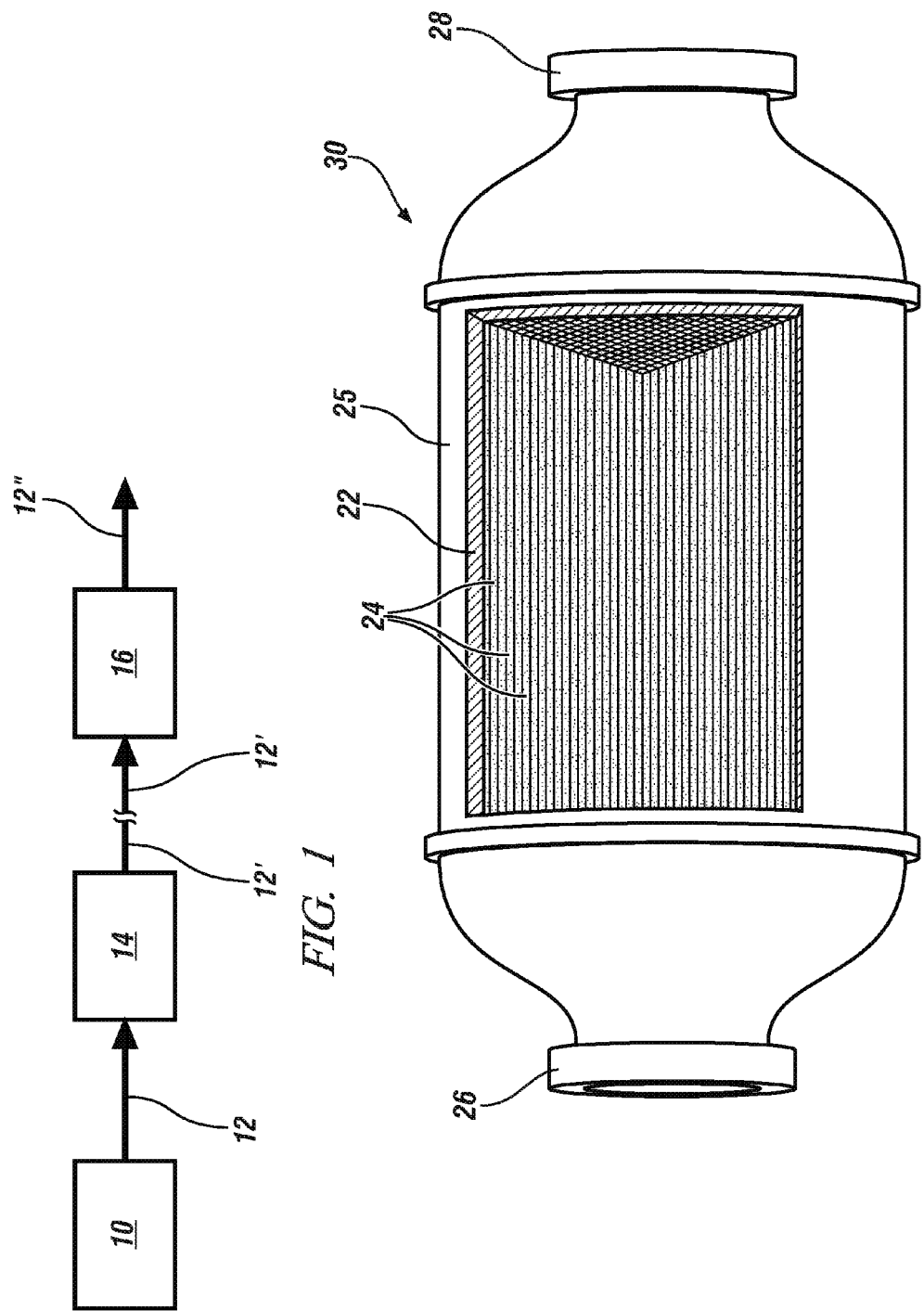

SULFUR-TOLERANT PEROVSKITE NO$_x$ OXIDATION CATALYSTS

TECHNICAL FIELD

This invention pertains to sulfur-tolerant oxide perovskite compositions suitable for use as oxidation catalysts for NO$_x$ in a diesel engine exhaust stream with sulfur-containing gases or vapors.

BACKGROUND OF THE INVENTION

Modern internal combustion engine-powered vehicles almost uniformly employ means of exhaust gas treatment prior to exhaust gas discharge to the atmosphere. For non-particulate components of the exhaust, treatment often consists of promoting chemical reactions to manage the composition of the exhaust gases.

This is usually accomplished by directing the engine exhaust gases into an exhaust system incorporating catalytic materials for controlled reaction of the exhaust gases before their release into the atmosphere. Catalytic materials may promote only selected chemical reactions, or selected classes of reactions, so that it is often necessary to incorporate more than one catalyst into the exhaust system. When it is desired to promote a multi-step reaction, a series of catalysts suitably arranged for specific sequential exposure to the exhaust gases may be required.

Diesel engines and other lean-burn engines or power plants are operated at higher than stoichiometric air to fuel mass ratios for improved fuel economy. Such lean-burning engines emit an exhaust gas with a relatively high content of oxygen and nitrogen oxides (NO$_x$). For example, a representative composition contains, by volume, about 6-17% oxygen, 3% carbon dioxide, 0.1% carbon monoxide, 180 ppm hydrocarbons and 235 ppm NOR. The balance of the exhaust gas is nitrogen and water with small concentrations of sulfur-containing compounds, primarily SO$_2$. It is preferred to reduce the NO gases, typically comprising nitric oxide (NO) and nitrogen dioxide (NO$_2$), to nitrogen (N$_2$), but these reactions are impeded by the high oxygen (O$_2$) content in the exhaust stream.

Several approaches have been suggested to overcome this limitation, including NO$_x$ storage and reduction catalysts and the introduction of ammonia or hydrocarbons into the exhaust stream to facilitate NO$_x$ reduction.

However the high oxygen content of a lean burn engine exhaust, 6-17% by volume, renders the reduction of NO$_2$ to N$_2$ more favorable than the reduction of NO to N$_2$. It may therefore be preferred to deplete the exhaust stream of NO and enrich it in NO$_2$ by promoting the oxidation of NO to NO$_2$ in the oxidation catalyst, prior to reduction. But many of the proposed catalysts include expensive noble metals and may be rendered ineffective by the presence of sulfur-containing gases in the exhaust stream.

There is thus a need for less expensive sulfur tolerant oxidation catalysts suitable for operation in a diesel exhaust environment.

SUMMARY OF THE INVENTION

Certain oxide perovskites, crystalline compounds with the general formula ABO$_3$ where 'A' and 'B' are chemically-distinct cations and O is the oxygen anion, may perform satisfactorily as oxidation catalysts in a diesel engine exhaust.

Many cation species are capable of forming oxide perovskites, but many of the common perovskites are 'poisoned' by the sulfur in the ex haunt gases, leading to a rapid and unacceptable loss of catalytic activity. Yet other oxide perovskites, however, have demonstrated continuing satisfactory catalytic capability even in the presence of such sulfur-containing gases. Currently, however, determination of the sulfur tolerance of specific perovskites however, may only be determined only through the preparation and experimental evaluation of individual perovskites, a slow and tedious process.

Poisoning occurs through at least partial substitution of the oxygen anions in the perovskite crystal with sulfur anions, a process called sulfation of the perovskite. But the sulfur anion is about 30% larger than the oxygen anion it replaces, so substitution of the oxygen anion with the sulfur anion will result in distortion of the perovskite crystal.

The inventors have determined that in perovskite crystals in which the 'A' and 'B' cations have small atomic radii, and thus adopt a compact crystal structure, the distortion is sufficiently severe that the perovskite crystal will reject or expel the sulfur anion. These perovskites with small ionic radius cations therefore have a credible likelihood of suppressing sulfation and continuing to perform as oxidation catalysts even in gas mixtures, which, like diesel exhaust, include sulfur-containing gases Because the ionic radii of chemical species have been broadly compiled, the identity of suitable cations for such perovskites may be systematically investigated, whether or not such perovskites have been experimentally synthesized.

The inventors have considered a wide range of cationic species and identified their ionic radii in a presumptive perovskite crystal. These cation and oxygen anion ionic radii may be combined into two structural factors which have been demonstrated to predict perovskite formation. By computing these structural factors for all possible cation combinations those cation combinations which may be expected to form perovskites may be identified.

Of these perovskite-forming cation combinations, only some will be sulfur-tolerant. These sulfur-tolerant compositions may be identified by comparing the A and B ionic radii the perovskite-forming cation combinations with a limiting or threshold value at which sulfur-tolerant characteristics are observed in some synthesized perovskites.

Those perovskite-forming cation combinations with ionic radii which substantially match or are smaller than the threshold, have a credible expectation of sulfur tolerance. Such perovskites may therefore be placed in the exhaust of a diesel engine to promote oxidation reactions, including oxidation of NO to NO$_2$, without undergoing sulfur poisoning.

The cations which may form such sulfur tolerant perovskites include one or more A cations selected from the group consisting of Tm, Hg, Na, Yb, Ca, Pr, Nd, Pm, Sm, Cd, Ag, Tb, Ho, Y, Er, Lu, Pd, Ti, Cr, In, Pt, V, Li, Sb, Sc, Sc, Cu, Mg, Nb, Ta, Mo, Ru and Mn; and one or more 'B' cations selected from the group consisting of Ge, Se, Tm, Ga and I.

The procedure may be generalized to perovskite-forming cation combinations with more than one A species or one B species. Multi-species perovskites of composition $A_{(1-x)}a_x B_{(1-y)}b_y O_3$ where A and a are chemically different species which occupy the 'A' sites, and B and b are chemically different species which occupy the 'B' sites, are known. For multi-species perovskite-forming cation combinations of this kind, the average ionic radii of the 'A' and 'B' cations may be determined as the molar-weighted average of the ionic radii of the individual species. These molar-weighted averages may then be employed to assess the sulfur-tolerance of such multi-species perovskite-forming cation combinations following the same procedure.

For such multi-species perovskites, it is only required that the 'A' and 'B' cations be draw n from the above listing, since their small ionic radii may offset the larger ionic radii of those cations which are not listed above.

The perovskite-forming cation combinations may be washcoated onto a suitable support, such as an extruded cordierite structure with honeycomb-like extruded channels, and placed in the diesel exhaust stream.

BRIEF DESCRIPTION OF THE DRAWINGS

FIG. 1 shows a flow diagram representation of a diesel engine and its exhaust scheme illustrating relevant portions of the exhaust aftertreatment scheme for gaseous exhaust components.

FIG. 2 illustrates, in partial cutaway, a representative catalytic convertor incorporating an extruded catalyst substrate/support.

In FIG. 3A the body-centered position is shown occupied by an 'A' ion and in FIG. 3B the body centered position is shown occupied by a 'B' ion. In FIG. 3B a plane of $\{110\}$ type is shown hatched.

DESCRIPTION OF PREFERRED EMBODIMENTS

Figure 3A:
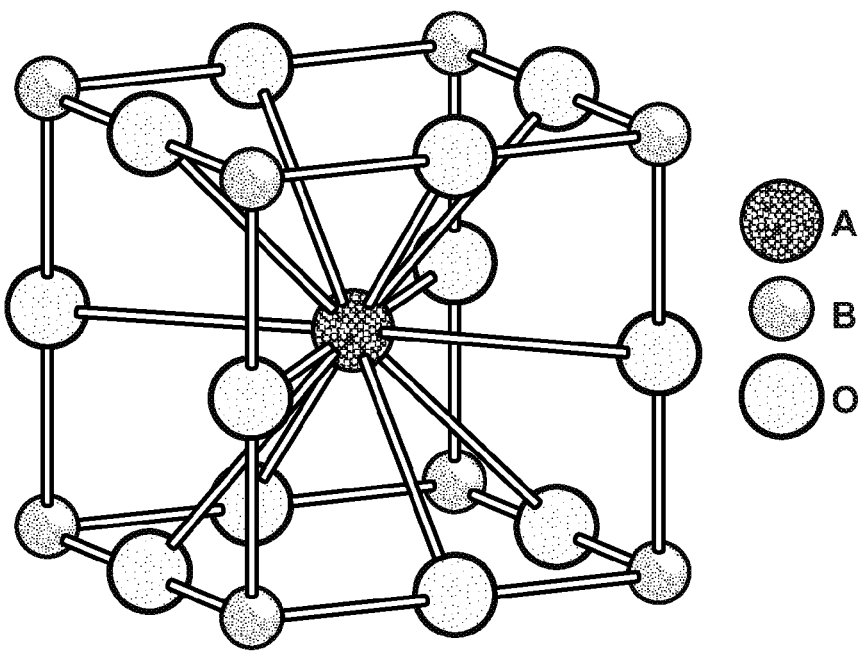
FIGS. 3A and 3B are equivalent representations of a unit cell of the cubic perovskite structure illustrating the locations of the 'A' and 'B' cations and the oxygen anions, not drawn to scale.

The exhaust from lean burn engines, including diesel engines, is typically managed using two catalytic convertors, possibly supplemented by a trap or other device for management of particulate emissions before being discharged to the environment.

A number of after-treatment processes may be conducted on the exhaust gas stream of a diesel engine. An example of a partial system for managing a diesel engine exhaust stream is shown in FIG. 1. As shown in FIG. 1, the exhaust stream 12 from lean burn engine 10 first passes through an oxidation catalyst 14. Then, compositionally-modified exhaust stream 12' is passed through a reduction catalyst 16 and exits as further compositionally-modified stream 12". Not shown in the figure is a particulate trap or similar structure, commonly used for management of particulates, which may be positioned between the oxidation and reduction catalysts.

The oxidation catalyst 14 may: oxidize CO to $CO_2$; oxidize hydrocarbons into $CO_2$ and $H_2O$; and oxidize NO to $NO_2$. The reduction catalyst 16 may primarily reduce NO and $NO_2$ to $N_2$. However the high oxygen content of a lean burn engine exhaust, 6-17% by volume, renders the reduction of $NO_2$ to $N_2$ more favorable than the reduction of NO to $N_2$. It is therefore preferred to deplete the exhaust stream of NO and enrich it in $NO_2$ by promoting the oxidation of NO to $NO_2$ in the oxidation catalyst.

The catalytic species may be deposited on a substrate, such as the extruded cordierite structure 22 with, typically, honeycomb-like extruded channels 24 with up to 400 gas channels per square inch and an open frontal area of about 71% as shown in FIG. 2. The catalyst and its supporting substrate is then packaged into catalytic convertor 30 comprising substrate 22 and container 25 with suitable means for attachment into the engine exhaust system, such as flanges 26, 28. Catalytic convertor 30 may be placed at any suitable location in the engine exhaust system, but is often located close to the engine and is therefore subject to exhaust gases with temperatures which may approach 900° C., but, more commonly range from about 200° C. to 500° C.

The significance of the oxidation reaction of NO to $NO_2$ as a precursor reaction for promoting extensive reduction of oxides of nitrogen to $N_2$ mandates the use of an oxidation catalyst capable of efficient operation in a diesel engine exhaust. In particular oxidation catalysts should be capable of sustained catalytic activity in the presence of sulfur-containing gases, predominantly $SO_2$, commonly found in lean-burn engine exhaust generally and diesel engine exhaust gas particularly.

Perovskite oxides may be suitable catalysts, but their long term performance is composition-dependent. Some compositions are tolerant of the sulfur-containing gases while others are 'poisoned'. Generally those oxide perovskite catalysts which are 'poisoned' by sulfur, or demonstrate a marked reduction in catalytic activity when exposed to sulfur-containing gases, react with the sulfur to form compound in which at least some of the oxygen ions are replaced by sulfur ions.

Perovskites belong to a broad class of chemical compounds of general formula $ABX_3$, where 'A' and 'B' are two cations of very different sizes, and 'X' is an anion that bonds to both. A particularly important class of perovskites is oxide perovskites with the general chemical formula $ABO_3$. These oxide perovskites may be viewed as A-based and B-based oxides occurring in specified combination based on the valences of the individual cations. As will be detailed subsequently, it will be useful to view oxide perovskites as layered structures in which individual layers contain only 'A' or 'B' cations.

Within the $ABO_3$ perovskite structure specific cations are associated with specific lattice sites. These sites are designated as 'A' sites and 'B' sites and are identified as such in the sketches of the cubic perovskite structure shown in FIGS. 3A and 3B. In FIG. 3A, the cubic structure is centered on the 'A' cation while in FIG. 3B, the more common representation, the structure is centered on the 'B' cation. Because of size differences between 'A' and 'B' sites each site is identified with specific cations with larger cations occupying 'A' sites and smaller cations occupying 'B' sites.

Figure 3B:
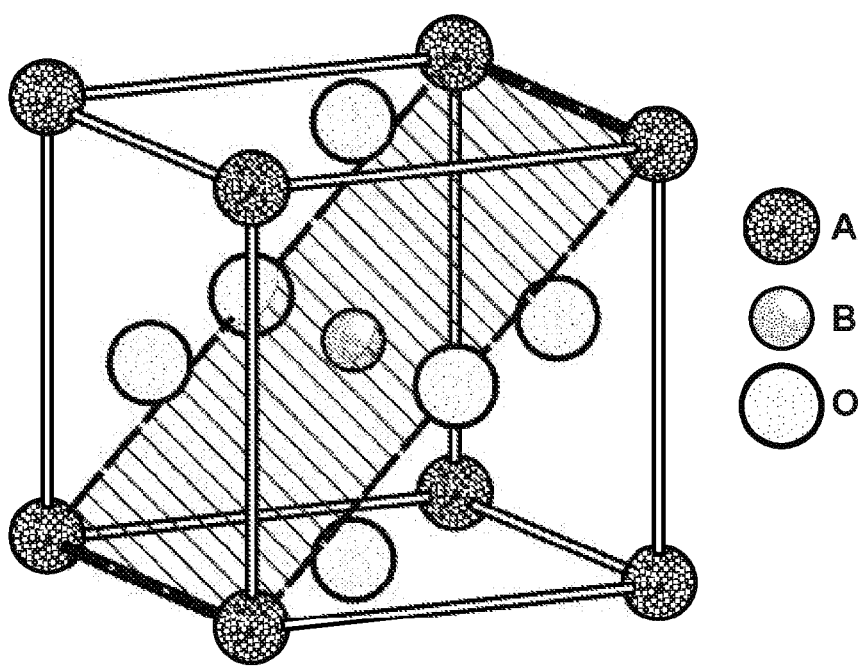

FIGS. 3A and 3B are not drawn to scale. The locations of the ion centers are shown, but the sizes of the individual ions are chosen only to readily distinguish between them, and are not representative of a perovskite structure comprising any specific ionic species. A more accurate representation of the ion size is shown in FIG. 4 which shows, approximately to scale, the projection of a $\{110\}$-type plane, shown as hatched in FIG. 3B, on which the appropriate ionic dimensions have been overlaid for the perovskite, $SrTiO_3$, where strontium (Sr) is the 'A' ion and titanium (Ti) is the 'B' ion.

Figure 4:
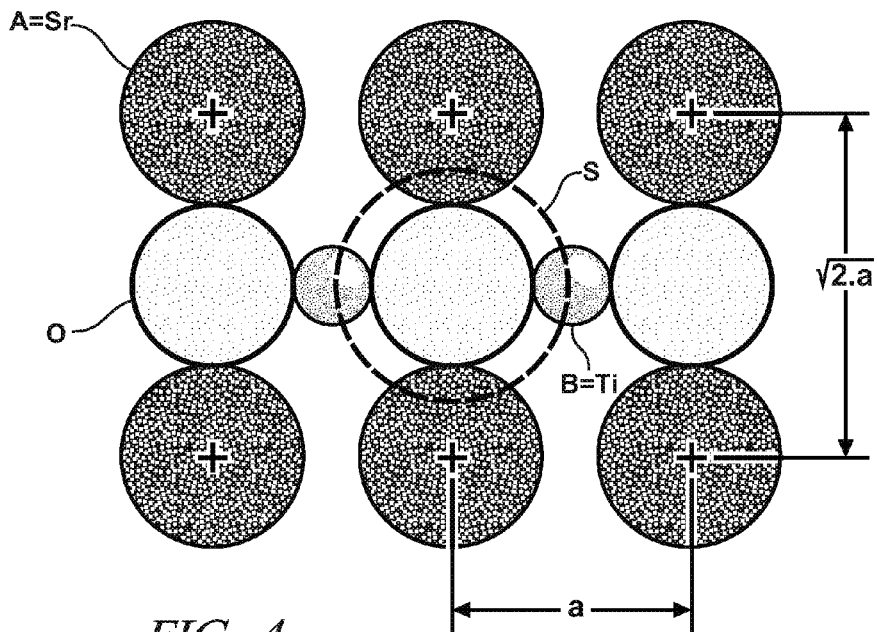
FIG. 4 shows, approximately to scale, the projection of the $\{110\}$ type plane of FIG. 3B for a perovskite based on $SrTiO_3$ showing the relative positions and sizes of the ions on which has been superimposed a representation of a sulfur ion at the same scale.

FIG. 4 also shows, in dotted outline, a representation of the ionic diameter of the sulfur ion overlaid on the oxygen ion to illustrate the large relative size difference between the sulfur and oxygen ions. As noted earlier, oxide perovskites, poisoned by sulfur, form compounds in which the sulfur ion substitutes for the oxygen ion. The marked size difference between the sulfur and oxygen anions, as shown in FIG. 4, clearly shows that substitution of the sulfur ion for an oxygen ion may produce considerable lattice distortion.

FIG. 4 illustrates the basic relations which must be satisfied to achieve close packing in the cubic perovskite structure. The 'A' ions, here Sr, are spaced a distance corresponding to $\sqrt{2}.a$ apart where a is the lattice parameter. The oxygen ion is positioned between the 'A' ions. The oxygen ion is also positioned between the 'B' ions which are spaced a distance a apart. Hence in a close-packed structure when all ions just contact one another:

$$(2r_O + 2r_B) = a$$

and $$(2r_O + 2r_A) = \sqrt{2}.a$$

or $$\frac{(r_O + r_A)}{\sqrt{2}.(r_O + r_B)} = 1$$

Generally close packing does not occur but the ions will continue to adopt the perovskite structure even if the ratio does not identically equal unity. To address this situation, a parameter, the Goldschmidt tolerance factor $t_p$, is defined as:

$$t_p = \frac{(r_O + r_A)}{\sqrt{2}.(r_O + r_B)}$$

The parallel between this relation and the condition for close packing is obvious, and it is widely accepted that provided t adopts a value not greatly different from unity, a perovskite structure will form.

More recently another important factor, the 'Octahedral factor', has been identified as indicative of whether or not a perovskite will form. The octahedral factor is the ratio of the 'B-cation' radius, $r_B$ to the 'oxygen-anion radius', $r_O$, and should exceed a value of 0.425 if a perovskite structure is to form.

Figure 5:
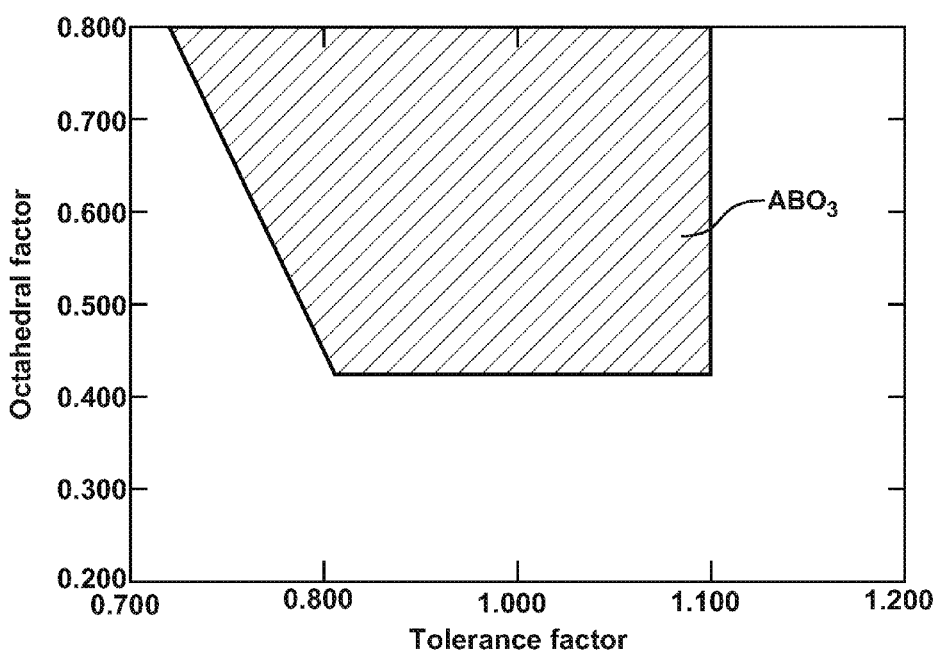
FIG. 5, (adapted from Li et al. Formability of Perovskites, Journal of Alloys and Compounds, Vol. 372, Pages 40-48, 2004) shows, as a hatched region on a cross-plot of Octahedral factor and Tolerance factor, the numerical combinations of Goldschmidt tolerance factor and octahedral factor which promote formation of perovskites, $ABO_3$.

The formation of perovskites of all classes has been studied by Li et al. (Formability of Perovskites, Journal of Alloys and Compounds, Vol. 372, Pages 40-48, 2004) and appropriate ranges of both the Goldschmidt and octahedral factors for perovskite formation have been identified. The summary representation of the results of Li et al. are shown in FIG. 5 which identifies a bounded, hatched region 40 of the Goldschmidt factor-Octahedral factor space in which perovskites are preponderantly observed to form. It is the object of this invention to use selected $ABO_3$ compounds with a Goldschmidt tolerance factor and octahedral factor which places them in the bounded range depicted in FIG. 5, as sulfur-tolerant catalysts. Clearly this requires knowledge of the ionic radii of the chemical species which compose the perovskite.

But, elements do not exhibit a unique ionic radius. Rather their ionic radius varies with charge, coordination number, spin state and other parameters. In FIG. 2 the representations of all ionic radii are based on unadjusted data from "*Revised Effective Ionic Radii and Systematic Studies of Interatomic Distances in Halides and Chalcogenides*" By R. D. Shannon. Central Research and Development Department, Experimental Station, E.I. Du Pont de Nemours and Company, Wilmington, Del. 19898, U.S.A., published in Acta Crystallographica. (1976), A32, Pages 751-767. These data are available as a 'Database of Ionic Radii' at a website hosted by the Materials Department of Imperial College (London, UK) at http://abulafia.mtic.ac.uk/shannon/.

An alternative view of the cubic perovskite structure is to view it as a layered structure with alternating layers of AO and $BO_2$ stacked as (200) planes, that is planes corresponding to the cube faces or the mid-planes located half-way between the cube faces. For example, FIG. 3A, centered on the 'A' cation clearly shows two $BO_2$ planes separated by an AO plane. Viewing the AO layer as a two-dimensional crystal in isolation it is clear that, with knowledge of the appropriate ionic radii an ideal AO cell or lattice dimension may be calculated. A similar cell or lattice dimension may be calculated for the $BO_2$ plane.

Of course few, if any, combinations of A and B cations will generate a common value of the theoretical AO and $BO_2$ cell dimension, and few, if any, measured values of the lattice parameter will exactly agree with the theoretical cell dimensions. However the smaller the cation ionic radius the smaller the expected lattice parameter and the greater the lattice strain or distortion if a sulfur anion is substituted for oxygen. Thus perovskites with small A and B ionic radii may offer superior sulfur tolerance. Superior sulfur tolerance is considered to be a less than 10% reduction in catalytic activity for oxidation of NO to $NO_2$ when the catalyst is operated in a gaseous environment comprising sulfur-containing gases for a period of 150,000 vehicle mileage equivalent hours.

A large number of perovskites spanning a range of A and B ionic radii are known and the existence of many more may be postulated. Not all of these perovskites will exhibit the desired sulfur resistance. Also there is no reasonable method to predict, a priori, what limiting ionic radii and thus what computed lattice parameter may confer sulfur tolerance. However, even a limited set of experimental results to evaluate the sulfur-tolerance of a number of compositionally-diverse perovskites may be used to calibrate the data-set of all possible perovskites by practicing the following procedure:

1. determine the relevant A and B ionic radii for all possible oxide perovskites;
2. compute Goldschmidt factors and octahedral factors for all possible 'A' ion and 'B' ion combinations, using oxygen as the anion;
3. determine which 'A', 'B' combinations are predicted to form an oxide perovskite by reference to FIG. 3 of this application;
4. rank, based on the Goldschmidt and octahedral factors, the A and B ionic radii for each tested perovskite;
5. determine the threshold Goldschmidt and octahedral factors below which the predicted perovskites will have an improved sulfur-tolerance;
6. determine which of the all predicted oxide perovskites have A and B ionic radii less than the threshold value for sulfur tolerance determined from the test data It will be appreciated that partial substitution of 'A' and 'B' ions on their individual sublattices or in their individual layers may occur, leading to perovskites of chemical formula $A_{(1-x)}a_xB_{(1-y)}b_yO_3$ where A and a are chemically different species which occupy the 'A' sites and B and b are chemically different species which occupy the 'B' sites. For these perovskites A and B ionic radii and associated lattice parameters may be imputed by weighting the contributions of the 'A' and 'a' species and of the 'B' and 'b' species according to their molar proportions.

It may also be noted that perovskites incorporating mixed 'A' and/or 'B' cations, particularly 'A' and 'B' cations of mixed valence, may create a defect structure leading to elevated bulk oxygen mobility and promoting enhanced catalytic activity. A suitable concentration of oxygen vacancies may also result from gas-phase reduction of the perovskite including, among others, reaction with NO, hydrocarbons or other oxidizible species.

Following the procedure described it has been determined that a threshold oxide perovskite formulation representing the onset of sulfur poisoning is the composition $LaCoO_3$. Using the ionic radius data of Shannon cited earlier for La anions in: 6-fold coordination state; and their most common oxidation state: and the Co ions in 12-fold coordination state; their most common valence state; and their 'high spin' state yields a threshold ionic radius for the A-cation of 0.136 nanometers (corresponding to $La^{3+}$) and a threshold ionic radius for the B cation of 0.061 nanometers (corresponding to $Co^{3+}$).

It is not known which of these parameters is controlling. However by applying the same conditions (appropriate coordination number, most common oxidation state and 'high spin') for all possible 'A' and 'B' ions, the perovskite-forming $ABO_3$ oxides may be established using FIG. 3. Then the A-cation and B-cation ionic radii of these perovskite-forming oxides may be determined and compared to the values determined for $La^{3+}$ and $Co^{2+}$ in $LaCoO_3$. Since $LaCoO_3$ represents a threshold condition for sulfur tolerance only those chemical species yielding a lesser value for the respective ionic radii may be credibly expected to display the enhanced sulfur tolerance called for in diesel engine exhaust applications Hence it has been determined that at least partial substitution of La with, in order of increasing effectiveness, one or more of Tm, Hg, Na, Yb, Ca, Pr, Nd, Pm, Sm, Cd, Ag, Gd, Tb, Ho, Y, Er, Lu, Pd, Ti, Cr, In, Pt, V, Li, Sb, Sc, Sc, Cu, Mg, Nb, Ta, Mo, Ru, or Mn and/or at least partial substitution of Co with, in order of increasing effectiveness, one or more of Ge, Se, Tm, Ga, or I may be credibly expected to yield oxide perovskites with suitable sulfur resistance.

More preferably, at least partial substitution of La with one or more of Ca, Ag, Gd, Tb, Y, Pd, Ti, Cr, In, V, Cu, Mg, Nb, Mo, Ru, Mn and/or at least partial substitution of Co with one or more of Ge, Se or Ga may be credibly expected to yield oxide perovskites with suitable sulfur resistance.

Most preferably, at least partial substitution of La with one or more of Y, Pd, Ti, V, Cu, Nb, Mo and/or at least partial substitution of Co with one or more of Ge or Se may be credibly expected to yield oxide perovskites with suitable sulfur resistance.

The procedure may be generalized to perovskites with more than one A species or one B species. Multi-species perovskites of composition $A_{(1-x)}a_xB_{(1-y)}b_yO_3$ where A and a are chemically different species which occupy the 'A' sites, and B and b are chemically different species which occupy the 'B' sites, are known. For such multi-species perovskites—the average ionic radii of the 'A' and 'B' cations may be determined as the molar-weighted average of the ionic radii of the individual species. These molar-weighted averages may then be employed to assess the sulfur-tolerance of such multi-species perovskites following the same procedure.

For such multi-species perovskites, it is only required that the 'A' and 'B' cations be draw n from the above listing, since their small ionic radii may offset the larger ionic radii of those cations which are not part of the list.

Perovskites may be fabricated in several ways, but one favored approach is to form an aqueous solution of the nitrates of 'A' and 'B' cations with the ratio of 'A':'B' being 1:1. For best results it is desired to regulate the concentration of the solution by adding a volume of water in proportion to the mass to the 'A' ion nitrate. Citric acid is then added at least in an amount equal to one mole of citric acid per mole of metal ions, or more preferably in 10% by weight excess.

Since, as noted earlier, 'A' and 'B' cation sites need not be uniquely associated with specific chemical species, it is clear that multiple nitrates in proportion dictated by the desired perovskite composition may be employed. It is expected that these 'factional' compositions (i.e. $A_{(1-x)}a_xB_{(1-y)}b_yO_3$) will produce supercell structures with appropriately-averaged dimensions.

After the reaction has gone to completion, evaporation of the water will result in the formation of a gel, which on further heating, will combust at about 300° C. On further exposure to still elevated temperatures of about 700° C. for a period of at least several hours, crystalline perovskites will result. Alternate wet chemical processes based on oxalates or acetates may be employed, but the citrate approach appears to yield perovskites with larger surface areas than many other approaches. Hence the citrate-based perovskite approach is preferred.

Alternatively perovskites may be fabricated by high temperature calcining of a mixture of oxides, carbonates, or, less frequently hydroxides of the cation species in appropriate molar proportion. Typically the starting materials are finely divided, for example y ball milling, thoroughly mixed and calcined at elevated temperatures, for example between 1000° C. and 1200° C. for a period of from one to three hours.

Either of the above practices is suitable for practice of this invention but other, less common, approaches such as plasma spraying are similarly suitable provided they enable generally homogeneous distribution of cations throughout the resulting perovskite volume.

The perovskite may generally be applied to a substrate, such as that shown at 22 in FIG. 2 by washcoating. An aqueous slurry of the perovskite, possibly with minor additions of basic or acidic compounds to control pH, may be formed by ball milling. The slurry may be applied by dipping the substrate into the slurry, allowing the excess to drain and drying and calcining the perovskite-coated substrate in air at a temperature of about 500° C. All, or part, of the process may be repeated as required until the desired perovskite loading is achieved.

The practice of the invention has been illustrated through reference to certain preferred embodiments that are intended to be exemplary and not limiting. The full scope of the invention is to be defined and limited only by the following claims.

The invention claimed is:

1. A method of promoting the oxidation of NO to $NO_2$ in an exhaust stream of an operating diesel engine, the exhaust stream being at a temperature of up to 900° C. and also comprising sulfur-containing gases, the method comprising:
    bringing the exhaust stream into reactive contact with a sulfur-tolerant perovskite of general chemical formula $ABO_3$, where 'A' and 'B' are each distinguishable elemental cations, the perovskite comprising;
    one 'A' cation selected from the group consisting of Tm, Hg, Na, Yb, Pr, Nd, Pm, Sm, Ag, Tb, Ho, Y, Er, Lu, Pd, Ti, Cr, In, Pt, V, Li, Sb, Sc, Sc, Cu, Mg, Nb, Ta, Mo, Ru and Mn; and
    one 'B' cation selected from the group consisting of Ge, Se, Tm, Ga and I.

2. The method of claim 1 wherein the sulfur-tolerant perovskite comprises:
    one or more 'A' cations selected from the group consisting of Ag, Tb, Y, Pd, Ti, Cr, In, V, Cu, Mg, Nb, Mo, Ru and Mn: and
    one or more 'B' cations selected from the group consisting of Ge, Se and Ga.

3. The method of claim 1 wherein the sulfur-tolerant perovskite comprises:

one or more 'A' cations selected from the group consisting of Y, Pd, Ti, V, Cu, Nb and Mo; and one or more 'B' cations selected from the group consisting of Ge and Se.

4. The method of claim 1 in which the perovskite is supported on a cordierite substrate.

5. The method of claim 4 in which the perovskite is applied to the cordierite substrate by washcoating.

6. A method of promoting the oxidation of NO to $NO_2$ in an exhaust stream of an operating diesel engine, the exhaust stream being at a temperature of up to 900° C. and also comprising sulfur-containing gases, the method comprising:

bringing the exhaust stream into reactive contact with a sulfur-tolerant perovskite of general chemical formula $La_xA_{(1-x)}Co_yB_{(1-y)}O_3$, where 'A' and 'B' are elemental cations, and where x and y may individually take any value between 0 and 1, provided only that both x and y are not 1, the perovskite comprising;

an 'A' cation selected from the group consisting of Tm, Hg, Na, Yb, Pr, Nd, Pm, Sm, Ag, Tb, Ho, Y, Er, Lu, Pd, Ti, Cr, In, Pt, V, Li, Sb, Sc, Sc, Cu, Mg, Nb, Ta, Mo, Ru and Mn; and a 'B' cation selected from the group consisting of Ge, Se, Tm, Ga and I.

7. The method of claim 6 wherein the sulfur-tolerant perovskite comprises:

an 'A' cation selected from the group consisting of Ag, Tb, Y, Pd, Ti, Cr, In, V, Cu, Mg, Nb, Mo, Ru and Mn: and a 'B' cation selected from the group consisting of Ge, Se and Ga.

8. The method of claim 6 wherein the sulfur-tolerant perovskite comprises:

an 'A' cation selected from the group consisting of Y, Pd, Ti, V, Cu, Nb and Mo; and a 'B' cation selected from the group consisting of Ge and Se.

* * * * *